(12) United States Patent
McEwan

(10) Patent No.: US 7,994,968 B2
(45) Date of Patent: Aug. 9, 2011

(54) RF MAGNITUDE SAMPLER FOR HOLOGRAPHIC RADAR

(75) Inventor: Thomas Edward McEwan, Las Vegas, NV (US)

(73) Assignee: McEwan Technologies, LLC, Las Vegas, NV (US)

( * ) Notice: Subject to any disclaimer, the term of this patent is extended or adjusted under 35 U.S.C. 154(b) by 310 days.

(21) Appl. No.: 12/380,337

(22) Filed: Feb. 26, 2009

(65) Prior Publication Data

US 2010/0214158 A1    Aug. 26, 2010

(51) Int. Cl.
*G01S 13/00* (2006.01)
*G01R 23/02* (2006.01)
*G11C 27/02* (2006.01)

(52) U.S. Cl. ............... 342/194; 327/45; 327/91; 327/94

(58) Field of Classification Search .................. 342/175, 342/194; 327/45, 91, 94
See application file for complete search history.

(56) References Cited

U.S. PATENT DOCUMENTS

| | | | | |
|---|---|---|---|---|
| 2,921,205 A * | 1/1960 | Giacoletto | ...................... | 257/212 |
| 5,337,054 A * | 8/1994 | Ross et al. | ...................... | 342/93 |
| 5,345,471 A * | 9/1994 | McEwan | ...................... | 375/130 |
| 5,517,198 A * | 5/1996 | McEwan | ...................... | 342/89 |
| 5,523,760 A * | 6/1996 | McEwan | ...................... | 342/89 |
| 5,966,090 A * | 10/1999 | McEwan | ...................... | 342/27 |
| 6,060,915 A * | 5/2000 | McEwan | ...................... | 327/94 |
| 6,061,551 A * | 5/2000 | Sorrells et al. | ...................... | 455/118 |
| 6,191,724 B1 * | 2/2001 | McEwan | ...................... | 342/21 |
| 6,229,999 B1 * | 5/2001 | Reits | ...................... | 455/280 |
| 6,414,627 B1 * | 7/2002 | McEwan | ...................... | 342/134 |
| 6,492,933 B1 * | 12/2002 | McEwan | ...................... | 342/28 |
| 7,224,944 B2 * | 5/2007 | McEwan | ...................... | 455/86 |
| 7,280,607 B2 * | 10/2007 | McCorkle et al. | ...................... | 375/295 |
| 7,369,598 B2 * | 5/2008 | Fontana et al. | ...................... | 375/130 |
| 7,386,292 B2 * | 6/2008 | Sorrells et al. | ...................... | 455/313 |
| 7,397,870 B2 * | 7/2008 | Batra et al. | ...................... | 375/340 |
| 7,417,582 B2 * | 8/2008 | Troutman et al. | ...................... | 342/68 |
| 7,773,031 B2 * | 8/2010 | Gazelle et al. | ...................... | 342/174 |
| 2010/0214157 A1 * | 8/2010 | McEwan | ...................... | 342/173 |
| 2010/0214158 A1 * | 8/2010 | McEwan | ...................... | 342/173 |

OTHER PUBLICATIONS

Seo et al, "A Low Power and High Gain Mixer for UWB Systems," IEEE Microwave and Wireless Components Letters, vol. 18, No. 12, Dec. 2008.
U.S. Appl. No. 11/891,364, filed Aug. 11, 2007, McEwan.

* cited by examiner

*Primary Examiner* — Thomas Tarcza
*Assistant Examiner* — Peter Bythrow

(57) ABSTRACT

A gated peak detector produces phase-independent, magnitude-only samples of an RF signal. Gate duration can span as few as two RF cycles or thousands of RF cycles. Response is linearly proportional to RF amplitude while being independent of RF phase and frequency. A quadrature implementation is disclosed. The RF magnitude sampler can finely resolve interferometric patterns produced by narrowband holographic pulse radar.

7 Claims, 3 Drawing Sheets under U.S. 7,994,968 B2

RF MAGNITUDE SAMPLER FOR HOLOGRAPHIC RADAR

BACKGROUND OF THE INVENTION

1. Field of the Invention

The present invention relates to radar detection circuits and more particularly to RF pulse detection circuits. The invention can be used to detect interferometric RF signals for high resolution holographic radar, rangefinding radar, motion sensing radar, and reflectometer radar.

2. Description of Related Art

High bandwidth sample-hold circuits can be used to receive radar signals for high resolution imaging, ranging and motion sensing applications. Optimally, the sample aperture is set to match the width of the pulse being sampled. When the RF signal is a short burst of sinusoids, the sample aperture is set to one-half of an RF cycle. Ultra-wideband (UWB) emissions are defined by the FCC as having greater than 500 MHz bandwidth.

A stringent requirement for UWB radar sampling is sample timing must coincide with the expected temporal location of an echo, otherwise the sampler would miss the echo. A timing error corresponding to ½ of an RF cycle could result in no reception. Low timing jitter is also extremely important. Excessive timing jitter in pulse-averaging UWB radar can have significantly reduced sensitivity, while a non-averaging radar can exhibit a significant number of misses. UWB samplers and mixer-integrators (i.e., correlators) are phase and frequency sensitive.

Most UWB radar signals contain multiple RF lobes due to differentiation in the antenna and pulse circuitry, or due to emissions produced by short burst transmit oscillators, generally with bursts of less than 2 ns wide. At least one full RF cycle is almost always involved in UWB reception. If the sampling aperture were set to one full RF cycle, a sampler or a correlator would integrate the RF signal across the sampling aperture and produce zero output. Clearly, it is necessary to sample a half cycle in these UWB applications. In burst mode, successive repetitions of ½ cycle sampling can occur across the burst When RF sinusoids are sampled using a UWB sampler, the sampled output is mixed-down, aliased or down-converted. In tank-level radar, a 6 GHz RF burst signal is can be down-converted to a 6 kHz expanded time burst signal by the sampler in concert with a stroboscopic timing system. Down-conversion allows signal processing to occur at greatly reduced bandwidth for reduced cost, reduced power consumption and improved accuracy.

In 1993, an averaging UWB sampler was disclosed in U.S. Patent, "Ultra-wideband Receiver," by Thomas McEwan, the present inventor. A capacitor is connected to an RF input, e.g., an antenna, and to one end of a diode. The other end of the diode is connected to a narrow gate pulse source. The combination of the gate pulse and RF signal produces conduction in the diode and the capacitor is charged in proportion to the RF signal during the gate pulse. By using a large capacitor, a large number of conduction cycles are required to produce a quiescent voltage on the capacitor. A large number of pulses are thereby integrated on the capacitor and UWB detection and down-conversion occurs at the capacitor connected directly to the antenna. This UWB sampler is extremely simple and highly sensitive. It is directed to the reception of wideband and UWB RF signals using narrow aperture gate pulses that are matched to the UWB input signal. Gate pulse width is generally set to ½ of an RF cycle in width. Gate pulse width cannot be set to one RF cycle or to a large number of RF cycles since the integrated, sampled average would be zero, or near zero, due to the fact that a received RF cycle must have a zero average in order to propagate through free space.

While aliasing can be advantageous, limitations occur in systems where timing jitter or RF oscillator phase noise is excessive. In these cases, it would be preferable to have a phase-independent sampler. Aliasing can also be a severe detriment in range-gated interferometric radar, e.g., holographic radar where a reference wave is employed. Undesired aliasing and desired interferometric patterns can be of the same order and thus indistinguishable. A non-aliasing magnitude-only sampler is needed. A range-gated interferometric radar is disclosed in copending U.S. patent application Ser. No. 12/380,324, "Range Gated Holographic Radar," by the present inventor, Thomas E. McEwan.

SUMMARY OF THE INVENTION

The invention includes a method of sampling the magnitude of an RF signal by producing a unipolar gate pulse at least two RF cycles in duration and coupling the unipolar gate pulse and the RF signal to a diode to produce diode conduction pulses during the unipolar gate pulse duration and during a portion of each RF cycle. At least two conduction pulses are integrated to produce a sample. The unipolar gate pulse can be less than 10 ns in duration to provide high temporal resolution sampling of the narrowband RF signal.

The invention is an RF magnitude sampler based on a diode for providing a conduction element, an RF port coupled to the diode for coupling a narrowband RF signal to the diode, a gate port coupled to the diode for coupling a unipolar gate pulse to the diode, wherein the gate pulse drives the diode into conduction during a portion of at least two RF signal cycles to produce conduction pulses; and an integrating capacitor coupled to the diode for integrating at least two conduction pulses to produce a sample. The invention can also include a bandpass filter coupled to the integrating capacitor for producing an intermediate frequency output responsive to an amplitude modulated narrowband RF signal. The invention can operate with a narrowband RF reference signal and RF radar echoes that form an interferometric pattern at the RF port.

Another embodiment of the invention forms a quadrature RF magnitude sampler that includes a first diode for providing a first conduction element, a second diode for providing a second conduction element, a first RF port coupled to a transmission line and coupled to the first diode for coupling an RF signal to the first diode, a second RF port coupled to a transmission line and coupled to the second diode for coupling the RF signal to the second diode, wherein the second port is physically spaced apart from the first port by a fraction of a wavelength along the transmission line, a gate port coupled to the first and second diodes for coupling a unipolar gate pulse to the diodes, wherein the gate pulse drives the diodes into conduction during the gate pulse duration and during a portion of at least two RF signal cycles to produce conduction pulses in the first and second diodes, a first integrating capacitor coupled to the first diode for integrating at least two conduction pulses and for producing in-phase samples, and a second integrating capacitor coupled to the second diode for integrating at least two conduction pulses and for producing quadrature-phase samples. The transmission line propagates an RF interference pattern formed by a reference wave and radar echoes.

Objects of the present invention are: (1) to provide a simple and low-cost gated, linear RF magnitude detector; (2) to provide a phase-independent gated RF detector; and (3) to provide an RF sampler that does not exhibit aliasing, down-converting or mixing.

DETAILED DESCRIPTION OF THE INVENTION

Figure 1:
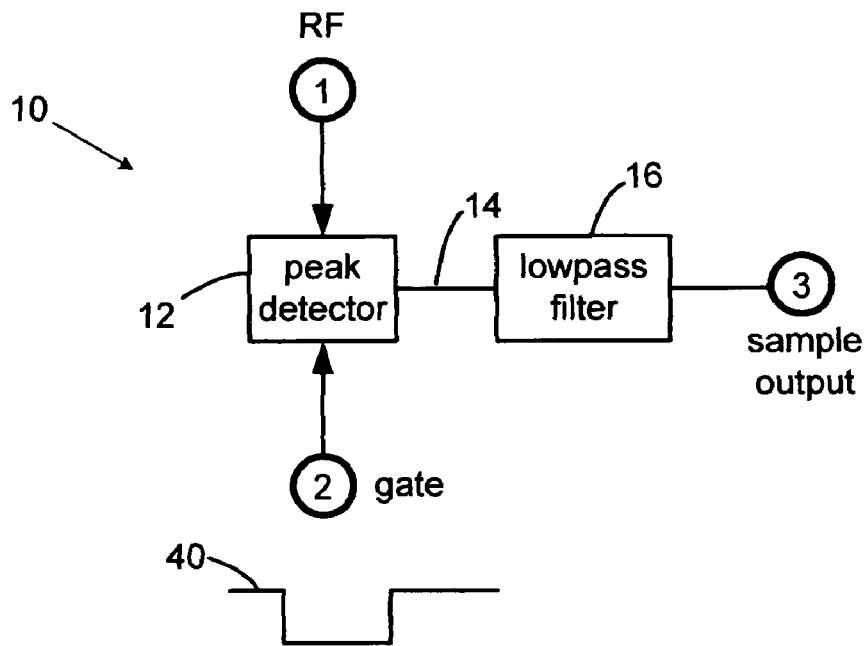
FIG. 1 is a block diagram of a sampler of the present invention.

A detailed description of the present invention is provided below with reference to the figures. While illustrative component values and circuit parameters are given, other embodiments can be constructed with other component values and circuit parameters.

General Description

The present invention overcomes the limitations of the various prior sampling receivers by employing a gated peak detector to produce phase-independent magnitude samples of an RF signal. The sampler operates by peak detecting RF signals with a time-gated peak detector and by integrating the peak detector output to provide an output sample. In one embodiment, an RF signal is summed with a gate pulse and applied to a Schottky diode, where the RF peaks in the combined waveform drive the diode into conduction and produce diode conduction current pulses only during the gate pulse duration. The diode conduction pulses are coupled to a capacitor or lowpass filter and integrated. When the gate pulse spans at least two RF cycles, two RF peaks will always occur within the duration of the gate pulse. Voltage on the capacitor will charge to maximum output within two RF cycles, or within a larger number of cycles depending on design parameters. Once the charge reaches maximum, no further change in sampled output will occur for continuing RF input signals of the same of lower amplitude. The sample amplitude is unaffected by the phase of the RF signal as long as two peaks occur within the gate duration.

Peak detected samples do not depend on the RF signal frequency or phase. Only the amplitude of the RF signal affects the output samples. As a consequence of phase/frequency independence, the sampler does not produce aliased or down-mixed signals. This is of critical importance in radar systems with noisy RF oscillators or timing jitter, and in holographic radars. Unlike prior samplers, the present sampler can sample and integrate across an arbitrary number of RF cycles and produce output samples that are substantially independent of RF phase and frequency. Thus, higher S/N can be achieved in situations where frequency or phase noise is high.

The present invention can exhibit limited sensitivity in certain circumstances, particularly in radars that do not employ a reference RF wave, e.g., in non-holographic radars. Without a reference RF wave, sensitivity can be limited to perhaps −50 dBm, on the order of 1 mV of RF. In this situation, the sampler is best suited for short range radar, perhaps less than several meters range, or for applications which employ preamplifiers. Nonetheless, the extreme simplicity and phase/frequency independence of the sampler makes it well suited to a broad class of short range radar applications.

In prior art sampling-type radars, including rangefinders and range gated Doppler sensors, the temporal jitter between the gate pulse and the echoed microwave sinusoids must often be on the order of 10 ps or less. This is a very stringent requirement, particularly when the gate pulse is delayed 100 ns or more. A delay of 100 ns corresponds to a range gate of 15 meters.

Also in prior art sampling-type radars, the sampling gate pulse is often set to ½ of an RF cycle in width. It cannot be set to one RF cycle since it would average the sample to zero due to the fact that a received RF cycle must have a zero average in order to propagate through free space. In contrast, the gate duration in the present invention can be two full RF cycles or more. It would seem that the present invention reduces spatial resolution compared to prior art samplers. However, most practical radars, such as tank level gauging radars, operate with an RF burst of perhaps 10 cycles or more. This is due to a combination of antenna and hardware bandwidth limitations, and to regulatory (e.g., FCC) limitations. Thus, extending the detection width from ½ to 2-cycles has virtually no effect on spatial resolution of practical radar sensors.

The sensitivity of the sampler is very high when a reference RF signal is combined with echoes to form an interferometric pattern and then input to the sampler. In this case, the reference RF wave can be large, on the order of +10 dBm. Diode threshold and low conduction effects are minimal under this RF condition, and sensitivity can be excellent. This mode is employed in copending U.S. patent application Ser. No. 12/380,324, "Range Gated Holographic Radar," by the present inventor. In this mode, the sampler produces short aperture, signed-magnitude samples of a holographic interference pattern produced by the addition of reference RF pulses and RF echoes.

In holographic radar, a reference RF signal and echo RF signals in combination can be propagated along a transmission line. Interference patterns form as a distributed pattern along the transmission line. Two samplers of the present invention can be located at taps on the transmission line with a spacing that corresponds to ¼ wavelength to produce quadrature samples. Since the interference pattern is formed by constructive and destructive combinations of the reference and echo RF signals, the combined magnitude can either increase or decrease along the line, relative to the reference pulse alone. The output samples can increase or decrease according to the interference pattern, i.e., signed magnitude samples are produced. The combination of signed magnitude samples and ¼ wavelength spacing produce samples that represent all four phase quadrants. Thus, phase quadrature I and Q samples of the interference pattern can be obtained using magnitude-only samplers of the present invention.

Output samples from the present invention can be passed though a bandpass filter with center frequency below a radar's PRF, where the bandpass filter passes an intermediate frequency IF. Radar transmit pulses can be amplitude modulated at the IF and consequently, samples of echoes will be modulated at the IF. The use of an IF provides benefits associated with classic superheterodyne receiver architectures, such as freedom from power supply and low frequency noise, the ability to use an AGC, and compact, convenient selectivity, noise filtering and amplification.

Two samplers of the present invention can be configured in a differential configuration to reject common gate pulse noise and to allow for balanced RF input without the need for a balun. Well-balanced RF baluns can be very difficult to fabricate and integrate. In the differential sampler configuration, one sampler forms a plus input and a second sampler forms a minus input. The sampler outputs can be summed with one output being inverted prior to summing. A common gate pulse can drive both samplers.

Specific Description

Turning now to the drawings, FIG. 1 is a block diagram of an exemplary high resolution sampler for radar signals, generally 10. A gated peak detector 12 has an RF port, labeled port 1, a gate port labeled port 2 and a peak detector output line 14. Line 14 is connected to lowpass filter 16. The integrator produces a sample output signal at port 3. Lowpass filter 16 can also be an integrator. Gate pulses depicted by waveform 40 are applied to the gate port and bias-on the peak detector, causing it to peak detect for the duration of the of the gate pulse, e.g., during the negative portion of gate waveform 40. Gate waveform 40 can be derived from a radar range gate generator. The gate pulse need not have any particular phase relation to the RF signal applied to port 1. However, it must be sufficiently wide to include at least two RF input cycles, which would inherently include two lobes having two associated peaks. The peak detector charges to a peak voltage determined in part by the RF signal at port 1. Gate pulse 40 can be on the order of 1 ns wide, which spans 10 cycles of a 10 GHz RF signal, for example.

Gate pulse 40 is derived from a clock signal or a pulse repetition frequency (PRF) oscillator. The gate pulse is often the result of trigging on an edge of a clock waveform, where the clock could be a transmit or receive timing clock with a fixed or adjustable delay, or a swept delay between them.

In a radar receiver application, the gate pulse need not be tightly phase locked to the RF phase at port 1, as would be the case in stroboscopic, or down-converting, sampling type radars. This independence from RF phase is due to the fact that peak detector 12 will ideally detect the peak amplitude of the RF signal within two RF cycles, independent of the phase of the RF cycles relative to the gate pulse. It is only necessary that the gate pulse span at least two RF cycle to ensure at the peak detector settles to a maximum within the gate pulse duration.

Gate pulse 40 can span many RF cycles, e.g., an aggregate of 10 or more cycles in a narrowband RF packet or burst, and peak detector 12 can incrementally charge to a peak value across the aggregate, where each increment corresponds to an RF peak. Integration is thereby performed during the peak detection process and peak detector hardware bandwidth requirements are minimized. As a further enhancement in some applications, peak detector 12 can hold its peak value with a small voltage droop across one or more pulse repetition intervals (PRI) to allow integration across multiple PRI's. Peak detector 12, in combination with lowpass filter 16 can integrate across a number of PRI's to reduce noise and interference levels.

Figure 2:
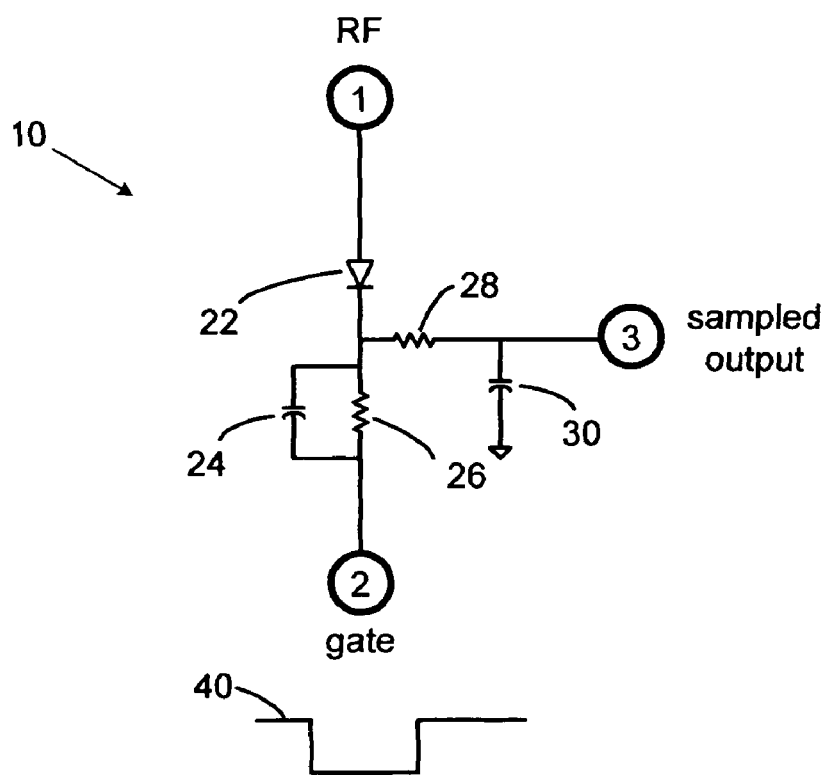
FIG. 2 is a schematic diagram of the sampler.

FIG. 2 is a schematic diagram of an exemplary sampler, generally 10. Diode 22 performs a peak detection function. It has an anode and cathode, and current (conventional current) primarily flows in one direction, from the anode to the cathode. In many applications, it is a Schottky diode. It can also be a diode formed by a transistor junction or by other diodes known in the art. Capacitor 24 is connected between the diode and gate port 2. It serves as a peak hold capacitor. Resistor 26 bleeds off the peak-held voltage at a rate determined by the application, and generally it must bleed off charge at a rate that can follow RF signal modulation. Resistor 28, in combination with capacitor 30, form a lowpass filter or an integrator. The lowpass filter provides RF isolation between diode 22 and output port 3; it blocks RF signals and gate pulses from coupling to output port 3. A time constant is formed by the product of resistor 28 and capacitor 30, which can be an integration time constant if set sufficiently large. Alternatively, if the time constant is short, the function of resistor 28 and capacitor 30 is mainly to block microwave frequencies and nanosecond speed gate pulses from appearing at port 3. Additional integration (i.e., time running averaging), or lowpass filtering, can occur downstream from port 3.

RF signals that are input to port 1 and gate pulses that are input to port 2 effectively add to the net voltage across diode 22. Diode 22 is driven into forward conduction when the net voltage exceeds its intrinsic threshold voltage, generally about 0.4V. Gate pulse 40 can have a voltage swing of 3V, while RF input signals are generally on the order of 1-100 mV. The upper level of gate pulse 40 is set to hold diode 22 biased OFF regardless of RF signal amplitude. When the gate pulse swings low, the combined RF and gate voltage bias-ON diode 22 during positive lobes of the RF signal. When the diode is biased-ON, diode conduction current pulses flow from the anode to the cathode of the diode. The diode conduction pulses flow into capacitor 24 and charge it to a maximum voltage that corresponds to the sum of the RF positive lobe peaks and the gate pulse. Substantial DC offsets exist due to the diode threshold and the gate pulse voltage. When no RF is present, capacitor 24 charges to a quiescent voltage due to repetitive gate pulses. RF signals produce incremental changes from the quiescent voltage on capacitor 24. Generally, DC offsets are of little concern since the sampled output at port 3 is generally amplified by an AC coupled amplifier or a bandpass filter. The location of diode 22 can be interchanged with capacitor 24 and resistor 26 with no change in operation, in principle. Diode 22 can be reversed, with a corresponding inversion of gate pulse 40.

Figure 3A:
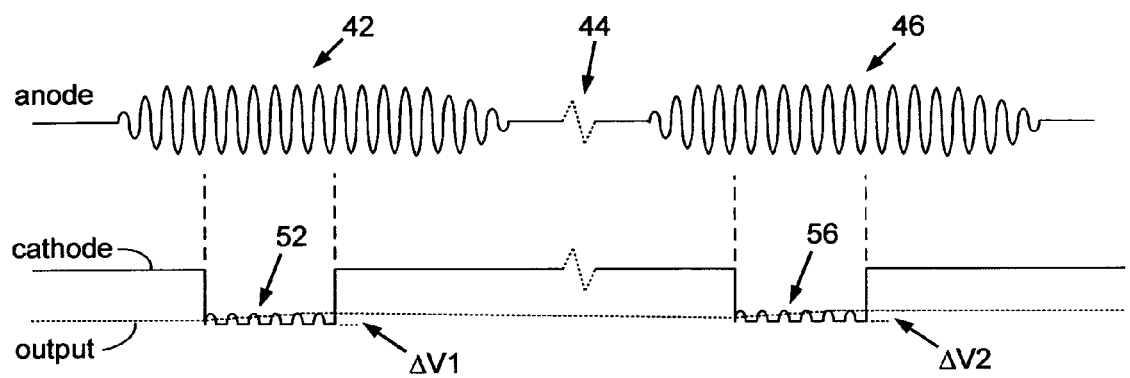
FIG. 3a is a waveform diagram of the sampler with an RF signal.

FIG. 3a is a waveform diagram of an exemplary sampler. An RF burst 42 is shown in the upper trace. One burst consists of about 15 cycles in this example; often it can consist of hundreds of cycles. Each individual RF cycle has a positive and negative peak. The present invention detects such peaks, often of one polarity only. Balanced, two polarity detectors can be configured by reversing the polarity of the diode and gate pulse in a second detector.

Dashed zig-zag line 44 denotes a cut-out portion of the trace. Line 44 was added for clarity of explanation; without line 44 the line connecting burst 42 to burst 46 could be very long. Burst 46 is a repetition of burst 42. The occurrence interval between the starts of burst 42 and burst 46 is the pulse repetition interval or PRI. The PRI can be staggered or otherwise modulated.

The lower waveform in FIG. 3a shows a solid trace labeled "cathode" and a dashed trace labeled "output." The cathode trace represents the voltage at the cathode of diode 22. It consists of gate pulse 40 that is coupled to the cathode, and positive RF signal peaks 52 and 56 from bursts 42 and 46 that couple from the anode to the cathode via diode conduction. Conduction occurs on at least a portion of the RF cycles that occur within the gate pulse duration, as indicated by the output trace.

The dashed trace is the voltage measured across peak hold capacitor 24. This is a differential voltage, i.e., the difference between the two plates of the capacitor. Gate pulse 40 appears on both plates equally and does not affect the exemplary differential trace. Diode conduction current pulses charge capacitor 24. Incremental charge voltages $\Delta V1$ and $\Delta V2$ indicate small increments in the capacitor voltage as a result of peak conduction pulses associated with peak voltages 52 and 56.

Voltage on capacitor 24 is coupled to output port 3 via a lowpass filter, e.g., resistor 28 and capacitor 30. This filter blocks pulses 52 and 56 from appearing at the output port. Resistor 28 allows for RF and gate pulse voltage swings at the cathode without introducing a shunting effect by capacitor 30 or by a load at port 3. Voltages appearing at the output port can be smoothed versions of ΔV1 and ΔV2. Either or both capacitors 24 and 30 can be sufficiently large as to integrate individual pulses 52, 56 across two or more PRI's. The amount of integration is a design choice.

Figure 3B:
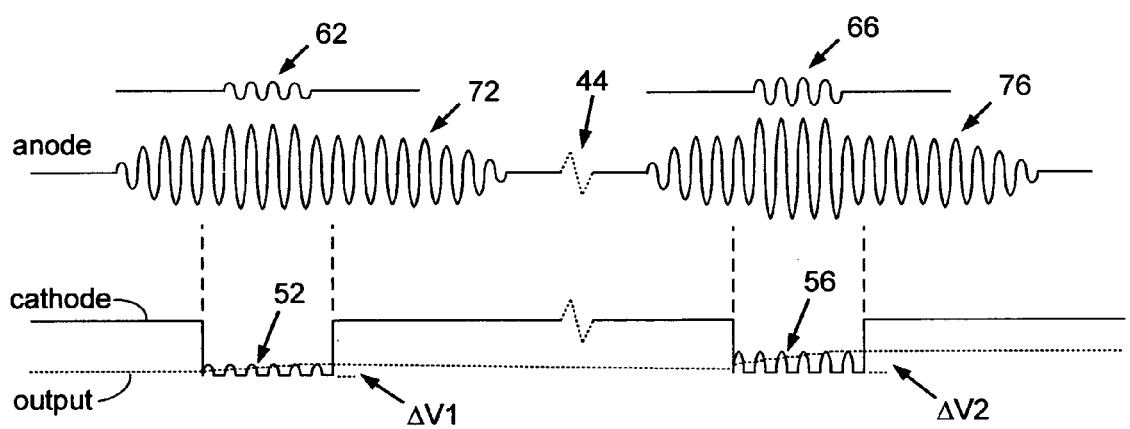
FIG. 3b is a waveform diagram of the sampler with an interferometric RF signal.

FIG. 3b depicts the further inclusion of echo pulses 62, 66. Depending on the exact phase of the echoes, they could add or subtract from RF bursts 42, 46. As shown, the echoes in this example add to form bursts 72, 76. Bursts 72, 76 are interferometric RF signals. Echo 66 is shown to be larger than echo 62 for illustrative purposes. Both echoes can be from the same target but the transmit amplitude can be modulated for the purpose of producing a modulated detected voltage, as seen by the differences ΔV1 and ΔV2 amplitudes in FIG. 3b.

Figure 4:
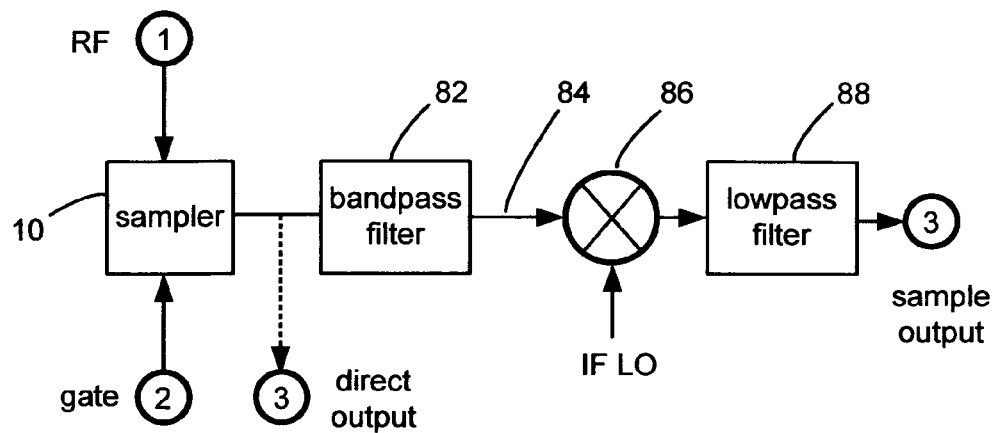
FIG. 4 is a block diagram of the sampler with an IF output.

FIG. 4 depicts sampler 10 additionally including a bandpass filter 82. Radar transmitters can amplitude modulate transmit RF pulses with each successive PRI or group of PRI's, to produce amplitude modulation of detected voltages ΔV1 and ΔV2. The modulation frequency must be lower than the inverse of the PRI, i.e., lower than the radar PRF. This frequency can be an intermediate frequency designated IF. Accordingly, bandpass filter 82 can be an IF filter and may include amplification. IF output from filter 82 can be coupled on line 84 to a mixer 86. Element 86 can also be analog switches or gates and may form a synchronous demodulation when switched, or mixed, with an IF local oscillator signal (IF LO). Element 86 can also be a simple diode-capacitor without an IF LO to simply envelop detect the IF signal on line 84. A lowpass filter 88 can be included to remove IF components and to pass detected baseband signals from element 86, and to provide a sample output signal at port 3. A dashed line and another port 3 are shown to indicate that sampler 10 can output both IF and "direct output" signals simultaneously for various radar purposes.

Figure 5:
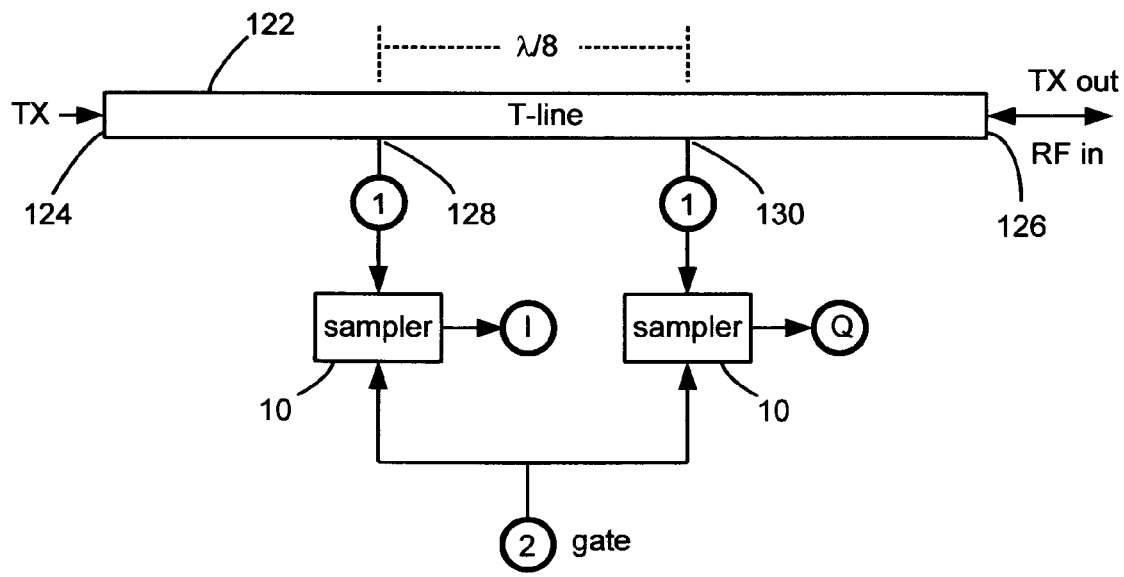
FIG. 5 is a block diagram of a quadrature configuration of the sampler.

FIG. 5 shows a quadrature version of exemplary sampler 10. A transmission line 122 propagates transmit radar pulses from end 124 to end 126 for transmission via an antenna or TDR line. Echoes return to line end 126. Transmit pulses are narrowband RF bursts such as bursts 42, 46 of FIG. 3a and are of sufficient duration as to extend beyond the time of occurrence of echoes. Echoes vector-sum with the transmit bursts to form interferometric patterns along line 122, similar to pulses 72, 76 of FIG. 3b. Two samplers 10 are coupled to taps at locations 128, 130. In this example, the samplers are gated by a common gate pulse applied to port 2; separate gate pulses can be applied for various purposes. Examples of transmission line 122 can include a microstrip, a coax, a waveguide or a lumped element structure. A quadrature network or various microwave phase splitters can be employed. In the event that line 122 is a waveguide, the taps can be waveguide current or voltage probes or ¼ wave monopole antennas inside the waveguide.

If taps 128, 130, i.e., coupling points, are spaced apart by ⅛ wavelength of the RF frequency, magnitude samples will be taken that represent in-phase I and quadrature phase Q components of the echoes. It is as though samples were taken ¼ wave apart by conventional phase-sensitive mixers. It should be noted that ⅛ wave spacing is used to achieve ¼ wave sampling due to 2-way travel on the line.

Magnitude samples of interferometric patterns produce signed magnitude samples, since echoes 62, 66 can have a phases that either add or subtract from transmit bursts 42, 46. In holographic terms, bursts 42, 46 are repetitive reference waves. The combination of signed magnitude samples and ⅛ wave taps produce output samples at ports labeled I and Q that fully represent the RF interference pattern in all four phase quadrants.

An RF signal is considered to include one or more cycles, each cycle having a positive and negative lobe, and each lobe having a peak. The use of the term "narrowband" herein refers to RF signals with a bandwidth that can fit in designated regulatory frequency bands, such as the ISM bands and other bands that are generally regarded as narrow plots of spectrum. Further, it can refer to amplitude modulated ON-OFF RF pulses with a number N of RF cycles in a burst, where N=2 and often 10 or greater. Since ultra-wideband signals have greater than 500 MHz bandwidth, narrow-band can be defined as having less than 500 MHz bandwidth. One example of a narrowband radar RF signal is a 1 MHz square-wave modulated 10.525 GHz RF carrier. Measurements indicate that such a carrier has less than 40 MHz occupied bandwidth (OBW, containing 99% of total power). Pulse holographic radar developed by the present inventor can exhibit spatial resolution normally associated with radar having 100 times more bandwidth.

Changes and modifications in the specifically described embodiments can be carried out without departing from the scope of the invention which is intended to be limited only by the scope of the appended claims.

What is claimed is:

1. A method of sampling the magnitude of an RF signal, comprising:
   providing an RF signal;
   producing a unipolar gate pulse at least two RF cycles in duration;
   coupling the unipolar gate pulse and the RF signal to a diode to produce diode conduction pulses during a portion of each RF cycle that occurs during the gate pulse duration; and
   integrating at least two conduction pulses to produce a sample.

2. An RF magnitude sampler, comprising:
   a diode for providing a conduction element;
   an RF port coupled to the diode for coupling an RF signal to the diode;
   a gate port coupled to the diode for coupling a unipolar gate pulse to the diode, wherein the gate pulse drives the diode into conduction during a portion of at least two RF signal cycles to produce conduction pulses; and
   an integrating capacitor coupled to the diode for integrating at least two conduction pulses to produce a sample.

3. The RF magnitude sampler of claim 2 further including a bandpass filter coupled to the integrating capacitor for producing an intermediate frequency output responsive to a modulated RF signal.

4. The RF magnitude sampler of claim 2 wherein the RF signal includes a reference signal and radar echoes that form an interference pattern at the RF port.

5. The RF magnitude sampler of claim 2 wherein the unipolar gate pulse is less than 10 ns in duration.

6. The RF magnitude sampler of claim 2 wherein the RF signal includes at least 10 RF cycles.

7. A quadrature RF magnitude sampler, comprising
   a first diode for providing a first conduction element;
   a second diode for providing a second conduction element;
   a transmission line for propagating reference and echo pulses, and for forming RF interference pattern signals along its length;
   an first RF port coupled to the transmission line and coupled to the first diode for coupling interference pattern signals to the first diode;

an second RF port coupled to the transmission line and coupled to the second diode for coupling interference pattern signals to the second diode, wherein the second port is physically spaced apart from the first port by a fraction of a wavelength along the transmission line;

a gate port coupled to the first and second diodes for coupling a unipolar gate pulse to the diodes, wherein the gate pulse drives the diodes into conduction during a portion of at least two RF signal cycles to produce conduction pulses in the first and second diodes;

a first integrating capacitor coupled to the first diode for integrating at least two conduction pulses and for producing in-phase samples; and, a second integrating capacitor coupled to the second diode for integrating at least two conduction pulses and for producing quadrature-phase samples.

* * * * *